United States Patent [19]

Ising

[11] Patent Number: 5,131,182
[45] Date of Patent: Jul. 21, 1992

[54] ENCAPSULATED FISHING LURE AND METHOD FOR MAKING

[76] Inventor: James I. Ising, 771 Ennis Dr., Orange Park, Fla. 32073

[21] Appl. No.: 631,737
[22] Filed: Dec. 18, 1990
[51] Int. Cl.⁵ .............................................. A01K 85/00
[52] U.S. Cl. ................................. 43/42.53; 43/42.33
[58] Field of Search ............ 43/42.53, 42.32, 42.33 X, 43/42.35

[56] References Cited

U.S. PATENT DOCUMENTS

| | | | |
|---|---|---|---|
| 2,694,877 | 11/1954 | Wise | 43/42.33 |
| 3,528,189 | 9/1970 | Lilley, Jr. | 43/42.33 |
| 4,215,506 | 8/1980 | LeBoeuf | 43/42.33 |
| 4,228,611 | 10/1981 | McGahee | 43/42.53 |
| 4,429,482 | 2/1984 | Honse | 43/42.33 |
| 4,717,605 | 1/1988 | Urban et al. | 156/275.7 |
| 5,007,975 | 4/1991 | Yamamoto et al. | 156/275.7 |

FOREIGN PATENT DOCUMENTS 462209  1/1950  Canada .............................. 43/42.33

Primary Examiner—Richard K. Seidel
Assistant Examiner—Chuck Y. Mah

[57] ABSTRACT

A fishing lure is formed from a pair of translucent body parts each having a curved cavity extending therein. The lure is provided with a pair of vinyl sheet members each having a lure decoration printed along a convex surface, and molded to conform to the curved cavity of a corresponding one of the body parts. A translucent adhesive joint is provided between each vinyl sheet and the corresponding cavity in order to obtain enhanced lure characteristics from the top and bottom of the lure.

7 Claims, 3 Drawing Sheets

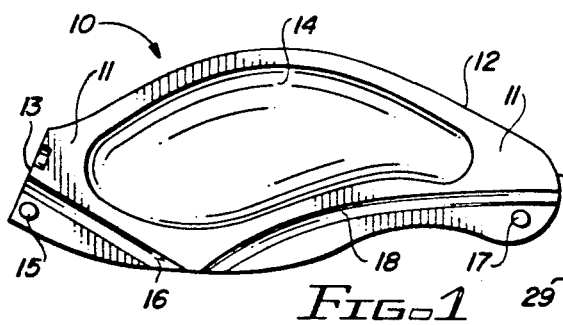
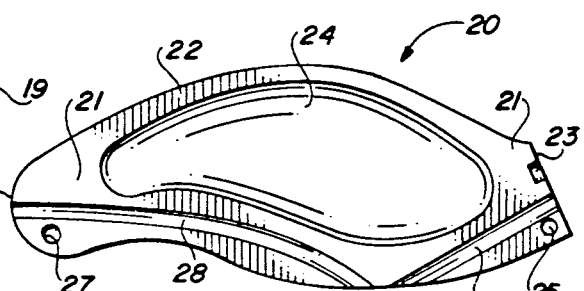
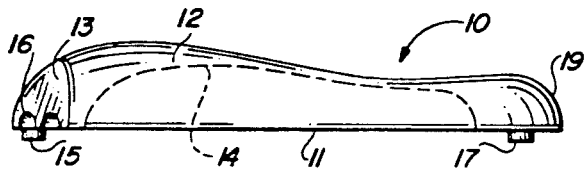
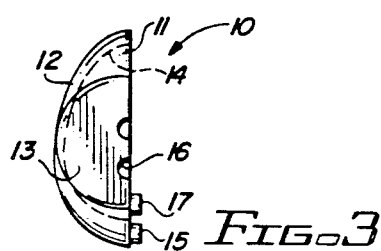
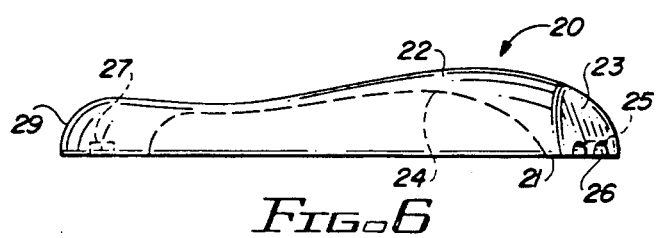
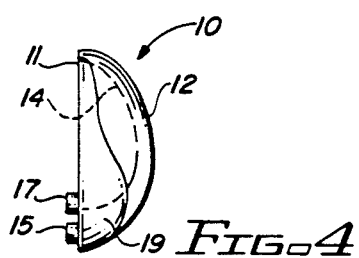
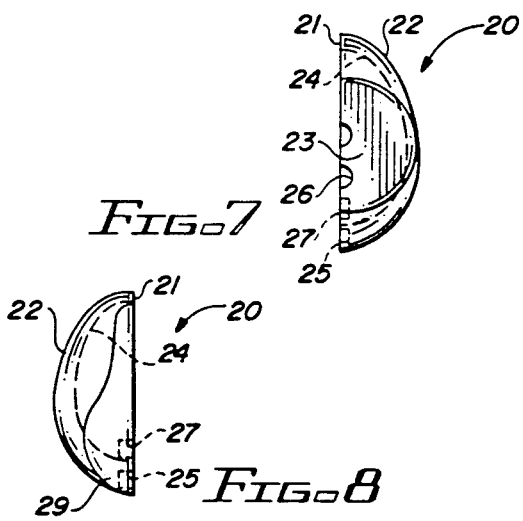
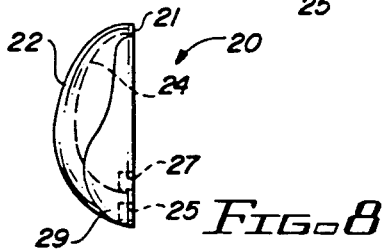
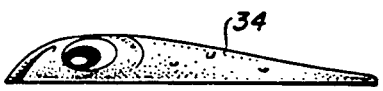
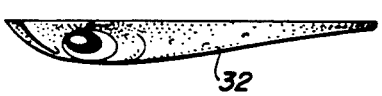

ENCAPSULATED FISHING LURE AND METHOD FOR MAKING

BACKGROUND OF THE INVENTION

The present invention relates generally to fishing lures, and in particular relates to an encapsulated fishing lure and a method for making such lures.

There are a number of prior art encapsulated lure designs. In one prior art arrangement, two plastic body halves are provided, with a cavity in each body part. The fishing lure design is painted across the surface of the cavity, and the two body parts are then adhered together. Another type of prior art lure incorporating an interior decoration utilizes a foam insert to extend within the cavity of the encapsulated body, the foam either having the lure design painted on its surface, or alternatively the foam being used as an insert to hold a flat plastic decoration outwardly against the surface of the body cavity.

SUMMARY OF THE INVENTION

The present invention contemplates both an encapsulated lure having an interior lure decoration which is highly visible from not only the opposing sides, but also the top and bottom of the lure in order to enhance the ability of the lure to attract fish. The present invention is also directed to a method for manufacturing the lure in a facile manner.

In accordance with the manufacturing method of the present invention, a pair of translucent body parts are provided, each having a cavity extending into the body from one side. A sheet of vinyl which is sufficiently thin to permit molding, but sufficiently thick to retain a molded shape after molding is printed with the desired lure decoration along one surface. Thereafter, the vinyl sheet is then appropriately molded so that the lure decoration appears along an outside convex surface. Preferably, a plurality of lure decorations are simultaneously molded.

Thereafter, the molded lure decorations are severed from the vinyl sheet in pairs which are mirror images. The molded and decorated vinyl sheet portions are then adhered to the surfaces of respective cavities of the body parts with an adhesive which is translucent after setting, and preferably which is activated only upon the occurrence of the specified event. In a preferred embodiment, the adhesive is one which is activated after being irradiated with ultraviolet light, in order to permit each decorated portion to be placed into the corresponding cavity and smoothed out to remove any bubbles and wrinkles. Thereafter, the body part is irradiated with ultraviolet light in order to activate the adhesive and insure a good, uniform bonding joint between each body part and the respective molded decoration. An internal wire member is inserted between the two body parts with exterior treble hooks, and then the two body parts are joined together with a translucent adhesive, preferably also the ultraviolet lightsensitive adhesive discussed above.

In a preferred embodiment of the method of the present invention, the molding step is carried out in a female molding arrangement, such that the decorated vinyl sheets are inserted with the decoration facing into the molded cavity. It has also been determined that vinyl sheeting on the order of between about 4.0 to 12.0 mils in thickness achieves the desired flexibility and molding characteristics for permitting ease of molding, while retaining the molded shape.

The fishing lure in accordance with the present invention thus provides a lure having a body of a translucent plastic with an internal cavity, the cavity having an outwardly facing wall, and with a lure decoration along the outwardly facing wall with a translucent adhesive joint between the lure decoration and the cavity wall. It has been found that the translucent adhesive joint imparts a desirable refraction of the image of the lure from all directions, when the lure decoration is firmly adhered to an internal curved cavity within the body. Thus, the refracted image of the lure appears not only from the two sides of the lure, but also from the top and bottom.

DESCRIPTION OF THE DRAWINGS

FIGS. 1–4 are side elevation, top, front and rear views, respectively, of a right hand body part useful in the fabrication of a fishing lure in accordance with the present invention;

FIGS. 5–8 are side elevation, top, front and rear views, respectively, of a left hand body part useful in the fabrication of a fishing lure in accordance with the present invention;

FIG. 11 is a top view of right and left hand molded lure decorations of the type printed on the sheet of FIG. 9, and after molding in the apparatus of FIG. 10;

DETAILED DESCRIPTION

Figure 9:
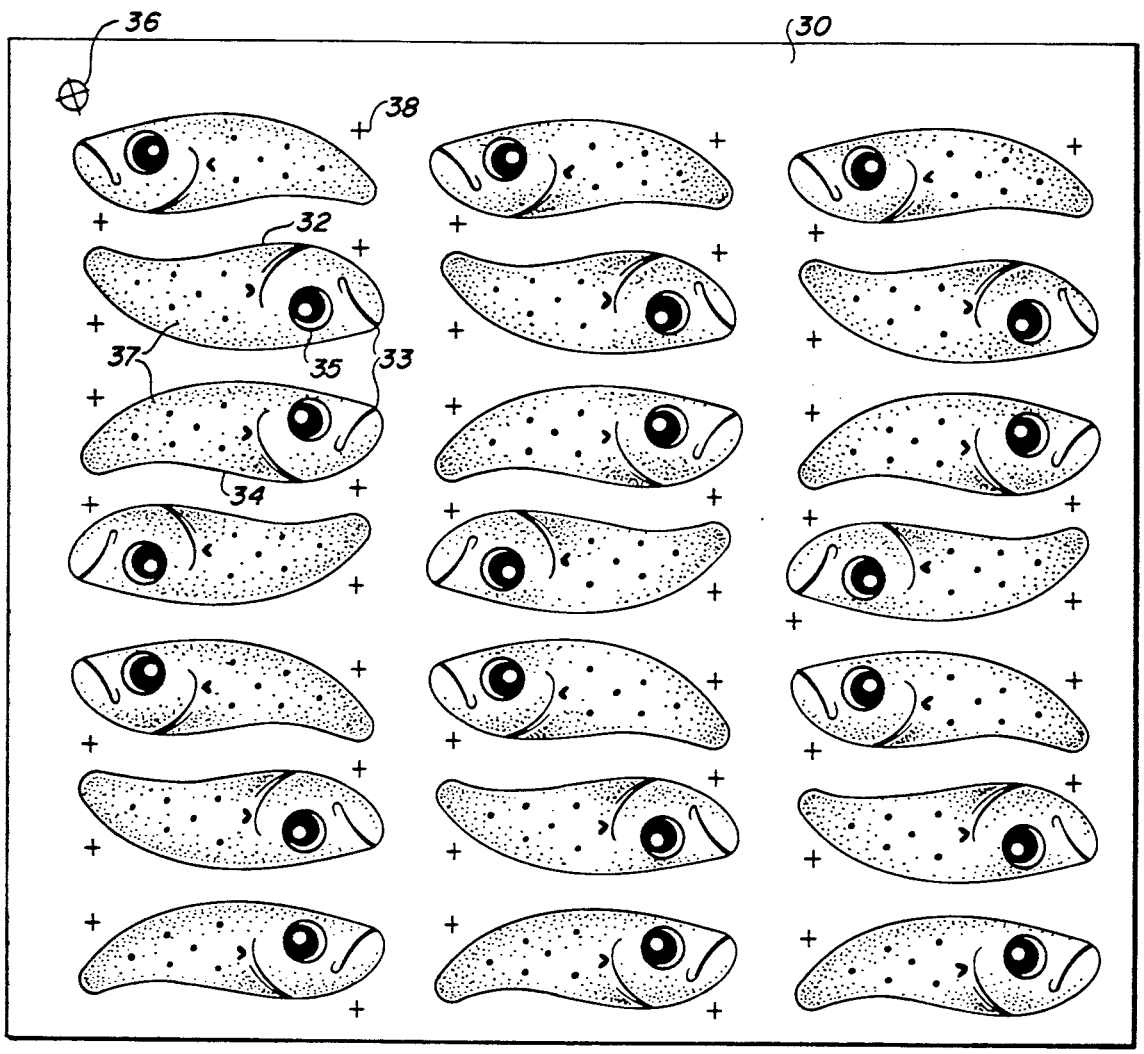
FIG. 9 is a top view of a flat carrier sheet useful for printing lure decorations in accordance with the method.

The method for making the fishing lure in accordance with the present invention will be described with reference to FIGS. 1–12.

Noting FIGS. 1–4, there is provided a translucent right hand body part 10 formed in a plastic member 12 having a flat internal surface 11 and a central cavity 14. The cavity has a generally curved surface, as is best seen in the end views of FIGS. 3 and 4. The body part 10 has a front face 13 which is angled so as to impart a diving action to the lure, and two joining tabs 15 and 17 at the opposing ends. Channels 16 and 18 are formed in the surface 11, the channel 18 extending to the rear 19 of the body part. The joining tabs 15 and 17 are used to join the body part 10 with a left hand body part (FIGS. 5-8), and the channels 16 and 18 permit the installation of a wire member for holding exterior hooks (note FIG. 13).

The left hand body part 20 shown in FIGS. 5 and 8 is also translucent, and is a mirror image of the body part 10 of FIGS. 1–4. In FIGS. 5–8, the same body element is referred to with a similar ending reference numeral; e.g., the cavity 24 of body part 20 corresponds to cavity 14 of body part 10, and so forth. However, the body part 20 includes a pair of holes 25, 27 extending into surface 21 and dimensioned to receive tabs 15 and 17 when the two body parts are brought together into a unitary (note FIG. 15).

Preferably, the two body parts 10, 20 are fabricated from a high impact translucent plastic, such as LEXAN (a trademark of the DuPont Company). While the body parts 10, 20 are described as translucent, they may be tinted with an appropriate color consistent with the lure decorations to be adhered into the cavities 14, 24 as described below.

Reference is now made to FIG. 9. In accordance with the present invention, a flat plastic sheet 30, preferably a vinyl, is provided. As will be described below, the vinyl sheet 30 is subjected to a molding step and is therefore selected so that it has sufficient flexibility to permit easy adherence into the cavities 14, 24 of the body parts 10, 20 but having a sufficient rigidity to retain a molded shape after being molded. To this end, it has been determined that a vinyl sheet having a thickness on the order of about 4.0 to 12.0 mils in thickness is suitable. Since vinyl sheets are frequently found in thinner gauges, it has been found necessary from time to time to sandwich two or more vinyl sheets together to achieve the desired thickness.

As shown in FIG. 9, a plurality of lure decorations are printed on to the vinyl sheet 30; preferably, the lure decorations are printed in adjacent mirror image pairs, as is illustrated by lure decorations 32 and 34. The particular lure decorations 32, 34 are depicted as a bait fish, with a mouth 33, eyes 35 and back colorations 37. All of these colorations are selected to attract fish, particularly the large eyes 35. The lure decorations are, of course, printed on the vinyl sheet 30 while in a flat condition. Mold guides 36 and 38 may also be printed on the sheet 30 with the lure decorations 32, 34.

Figure 10:
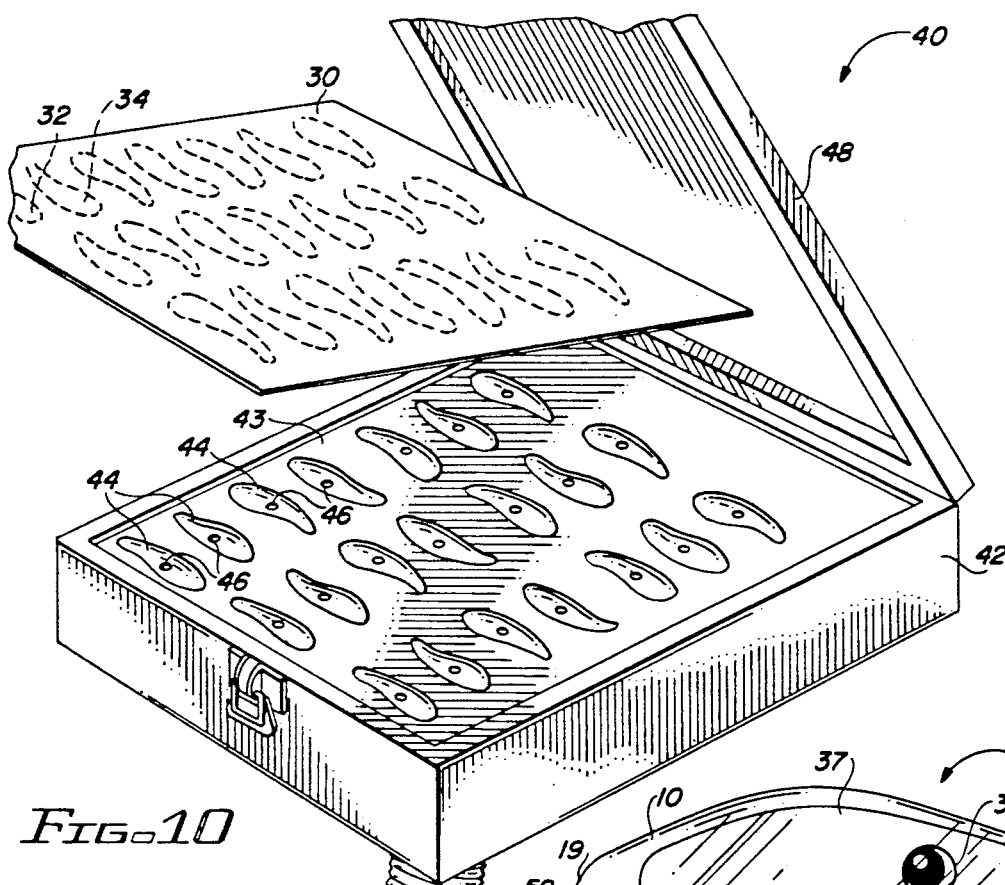
FIG. 10 is a perspective view of molding apparatus useful in the method.

The vinyl sheet 30 is then subjected to a molding step in an appropriate apparatus, such as the molding box 40 shown in FIG. 10. The molding box 40 includes a housing 42 forming a plenum and an upper plate 43 into which female cavities 44 are formed. Each cavity 44 includes an evacuation opening 46. The molding box 40 further includes an enclosing top 48 and an evacuation hose 50 through which a vacuum can be drawn. In use, the vinyl sheet 30 is inserted into the molding box 40, with the printed lure decorations 32, 34 facing downwardly toward corresponding cavities 44. A vacuum is then drawn through hose 50, while applying heat to the vinyl sheet 30 in a conventional manner. The sheet 30 is thus molded at each lure decoration 32, 34; it will of course be understood that the shape of the female cavity 44 at each position corresponding to a lure decoration 32, 34 has the shape of the printed lure decoration on sheet 30, which shape in turn corresponds to either the left or right hand cavity 14, 24 for the respective body part 10, 20. In the specific arrangement shown in the drawing, lure decoration 34 is a right hand decoration which corresponds in shape and dimension to the cavity 14 of body part 10 in FIG. 1, and lure decoration 32 is a left hand decoration which corresponds in shape and dimension to cavity 24 of body part 20 after it is molded.

After the molding step, all of the molded lure decorations, including decorations 32, 34 are severed from the vinyl sheet 30; the two severed lure decorations 32, 34 are shown in a top view in FIG. 11.

Figure 12:
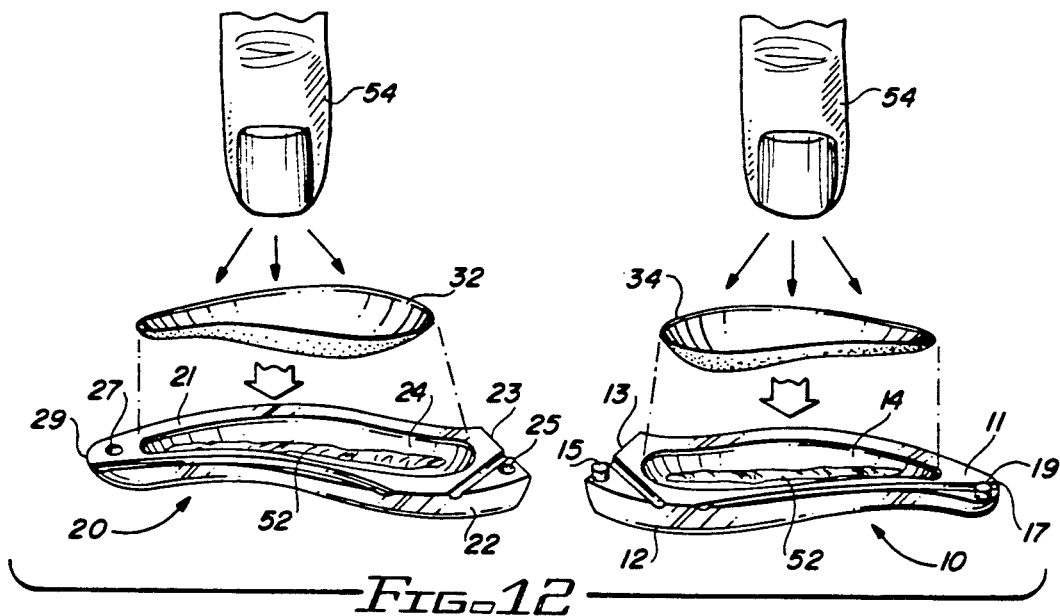
FIG. 12 is a perspective view illustrating steps of the method.
Figure 13:
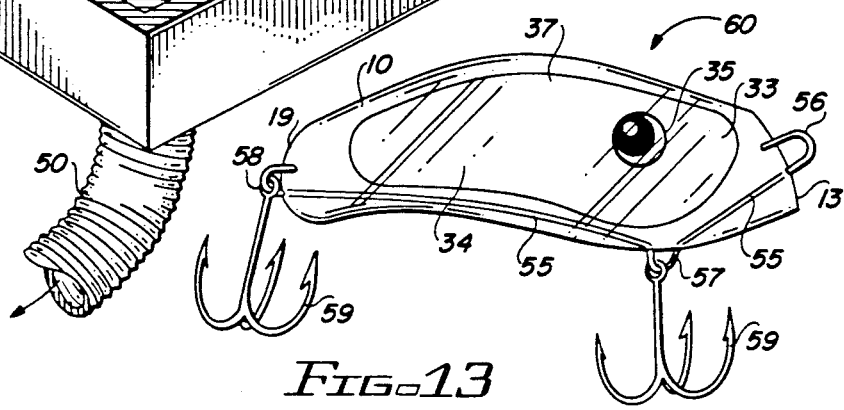
FIG. 13 is a side elevation of the right side of a finished lure in accordance with the present invention.

Reference is now made to FIG. 12. In order to bond the lure decorations 32, 34 to the respective cavity 24, 14 and achieve the desired refractive characteristics discussed above, a bead of an ultraviolet light-sensitive adhesive 52 is placed along the center of each cavity 24, 14. Thereafter, the corresponding lure decoration 32, 34 is placed into the respective cavity 24, 14 and manually pressed uniformly along the entire length and width of the lure decoration in order to spread the adhesive bead 52 into an adhesive joint uniformly between the lure decoration and the internal surface of the corresponding cavity 24, 14. Of course, this can be done manually by manufacturing worker using a finger 54, as is shown in FIG. 12, or may be done in an automated manner. In either event, it is important to remove all bubbles and wrinkles from between the lure decoration 32, 34 and the corresponding surface of the cavity 24, 14 in order to achieve the desired refraction characteristics discussed below. After achieving a uniform joint of the adhesive 52 across the surface of the cavities 24, 14, the body parts 10, 20 are subjected to ultraviolet radiation through the body part from the outside surface in order to cure the adhesive 52. A wire harness 55 and treble hooks 59 are then installed into one of the pair of channels 16, 18 or 26, 28 and the two body parts 10, 20 joined together with a translucent adhesive (which may also be the ultraviolet-sensitive adhesive described above). The resulting lure is shown in FIG. 13.

The manner in which the translucent adhesive joint achieves a desired enhancement of the fish luring ability for a lure manufactured in accordance with the present invention will now be described with reference to FIGS. 14 and 15.

Figure 14:
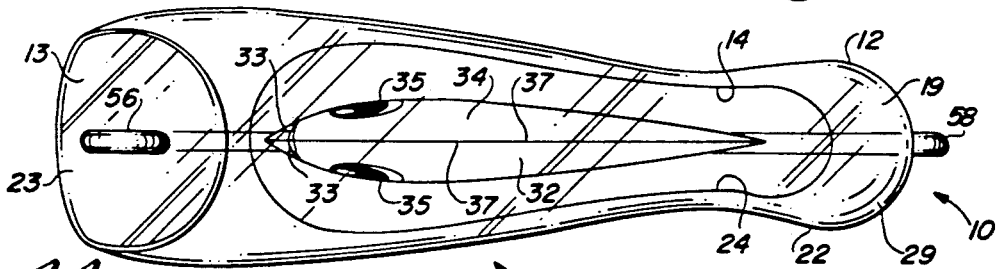
FIG. 14 and 15 are top views of fishing lures of the present invention, and which are used to illustrate the refractivity of the adhesive joint in accordance with the method.
Figure 15:
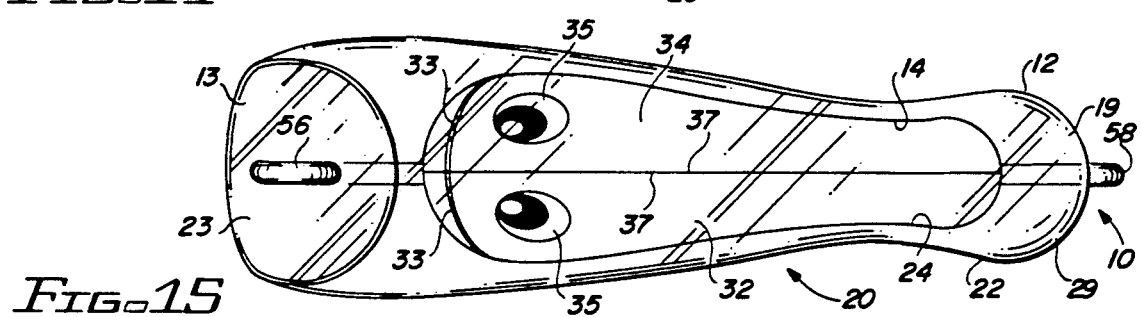

FIG. 14 illustrates a lure 70 fabricated essentially as described above, but in which the two lure decorations are not adhered with a translucent adhesive joint to the corresponding internal cavities 14, 24; that is to say, the lure decorations are simply placed into the respective cavities without any adhesive being added between the lure decorations 32, 34 and the adjacent body part 10 or 20. Although the lure decorations 32, 34 conform very closely to the shape of the respective cavity 24, 14, it can be seen in FIG. 14 that the refractivity of the body parts is such that the decorations 32, 34 virtually disappear when seen from the top. On the other hand, in FIG. 15, the two lure decorations 32, 34 are refracted through the adhesive joint from the top, and thus establish a full lure appearance from the top thereby enhancing the ability to lure fish from the top as well. A similar refraction occurs from the bottom of the lure.

This concludes the description of the preferred embodiments. A reading by those skilled in the art will bring to mind various changes without departing from the spirit and scope of the invention. It is intended, however, that the invention only be limited by the following appended claims.

What is claimed is:

1. A method for manufacturing a fishing lure comprising the steps of:
   providing a pair of translucent body parts, each body part having a curved cavity extending into the body from one side;
   providing sheet material;
   printing two lure decorations on to the sheet material, each of the lure decorations being a mirror image of the other;
   removing the lure decorations from the sheet material;
   molding the lure decorations on the sheet material so that the decorations are along an outside convex surface, so that each lure decoration faces outwardly through the corresponding body part when adhered within the corresponding cavity;

adhering each of the two lure decorations into the cavity of a corresponding body part; and joining the two body parts together into a lure body with the decorated means positioned inside and in translucent adhesive contact with the lure body.

2. The method recited in claim 1 wherein the decorated means adhering step comprises the step of:

selecting an adhesive which activates only upon the occurrence of ultraviolet radiation through each body part.

3. The method recited in claim 1 wherein the molding step is carried out before the step of removing the lure decoration from the sheet material.

4. The method recited in claim 1 further comprising the step of molding the sheet material in a female mold, with the lure decorations facing into the mold.

5. The method recited in claim 1 wherein the step of providing sheet material comprises the step of selecting a plastic sheet material which is sufficiently thin to permit molding, and sufficiently thick to retain the molded shape after molding.

6. The method recited in claim 5 wherein the selected sheet material comprises a vinyl sheet having a thickness on the order of between about 4.0 to 12.0 mils.

7. The method recited in claim 1 wherein the decorated means comprises a sheet material, and wherein the step of adhering the sheet material into a corresponding cavity further comprises the steps of:

placing an adhesive into each cavity;

placing a corresponding lure decorated sheet material into each cavity; and applying pressure to the inside of the sheet material so as to remove all bubbles and wrinkles, and to insure a uniform adhesive joint between the sheet material and the wall of the cavity.

* * * * *